(12) United States Patent
Kim et al.

(10) Patent No.: US 10,227,946 B2
(45) Date of Patent: Mar. 12, 2019

(54) METHOD FOR ENGINE DRIVABILITY ROBUSTNESS BY VARIABLE INDEXING AND VEHICLE THEREOF

(71) Applicants: HYUNDAI MOTOR COMPANY, Seoul (KR); KIA MOTORS CORPORATION, Seoul (KR)

(72) Inventors: Hee-Sup Kim, Hwaseong-si (KR); Jong-Sung Park, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/832,230

(22) Filed: Dec. 5, 2017

(65) Prior Publication Data

US 2018/0171929 A1 Jun. 21, 2018

(30) Foreign Application Priority Data

Dec. 19, 2016 (KR) .................. 10-2016-0173831

(51) Int. Cl.

| F02D 41/04 | (2006.01) |
|---|---|
| F02D 41/40 | (2006.01) |
| F02D 41/06 | (2006.01) |
| F02D 35/02 | (2006.01) |
| F02P 5/14 | (2006.01) |
| F02D 9/12 | (2006.01) |

(52) U.S. Cl.
CPC ......... F02D 41/402 (2013.01); F02D 35/025 (2013.01); F02D 41/061 (2013.01); *F02D 9/12* (2013.01); *F02P 5/14* (2013.01)

(58) Field of Classification Search
CPC ...... F02D 41/402; F02D 41/061; F02D 41/18; F02D 41/182; F02D 41/042; F02D 41/045; F02D 41/06; F02D 41/12; F02D 41/123; F02D 41/126; F02D 35/025; F02D 9/12; F02P 5/14
USPC ......... 123/436, 491, 493; 701/103–105, 112, 701/113
See application file for complete search history.

(56) References Cited

U.S. PATENT DOCUMENTS

| 4,201,262 A | 5/1980 | Goldstein |
|---|---|---|
| 2012/0117989 A1 | 5/2012 | Turney et al. |
| 2014/0076528 A1 | 3/2014 | Daly et al. |

FOREIGN PATENT DOCUMENTS

| JP | 2000-073823 A | 3/2000 |
|---|---|---|
| KR | 100235152 B1 | 12/1999 |

(Continued)

OTHER PUBLICATIONS

U.S. Office Action issued in U.S. Appl. No. 15/633,217 dated Aug. 27, 2018.

*Primary Examiner* — Hai Huynh
(74) *Attorney, Agent, or Firm* — Morgan Lewis & Bockius LLP (57) ABSTRACT

A method for engine drivability robustness includes: dividing, by an engine controller, an engine state into a starting condition, a stop condition, and a deceleration condition; dividing an injection mode index of a fuel injection into a suction compression injection of the starting condition, a suction split injection of the stop condition, and a suction compression split injection of the deceleration condition, respectively, depending on a low volatile fuel condition; and performing a variable indexing mode to prevent an engine off by applying a lambda control factor for a rich lambda control by an increase in fuel amount to the deceleration condition.

18 Claims, 4 Drawing Sheets

(56) References Cited

FOREIGN PATENT DOCUMENTS

| | | |
|---|---|---|
| KR | 10-2005-0060915 | 6/2005 |
| KR | 2012-0035709 A | 4/2012 |
| KR | 2013-0068535 A | 6/2013 |

METHOD FOR ENGINE DRIVABILITY ROBUSTNESS BY VARIABLE INDEXING AND VEHICLE THEREOF

CROSS-REFERENCE(S) TO RELATED APPLICATIONS

This application claims the benefit of priority to Korean Patent Application No. 10-2016-0173831, filed on Dec. 19, 2016, which is incorporated herein by reference in its entirety.

TECHNICAL FIELD

The present disclosure relates to a method for drivability robustness, and more particularly, to a method for engine drivability robustness by assigning indexes to various variables under low volatile fuel conditions, and a vehicle implementing the method.

BACKGROUND

Generally, when a fuel amount is reduced during driving of a gasoline vehicle, an exhaust gas emission amount is reduced to meet the exhaust gas regulations. However, a risk of having adverse effects on drivability such as an engine stall and a fluctuation in an engine revolution per minute (RPM) may be increased due to fuel natures.

This is due to natures of gasoline fuel variously changed by region and season, and of formation low temperature and low volatile fuel conditions by the changed fuel natures. Particularly, the adverse effect on the low temperature drivability due to the low temperature and low volatile fuel conditions is becoming serious in a gasoline vehicle to which a gasoline direct injection (GDI) engine is applied.

As a result, after a low temperature/low volatile fuel condition control mode (or low volatile fuel condition control logic) is applied to the gasoline vehicle, and the low temperature/low volatile fuel condition control mode determines the low temperature/low volatile fuel conditions, that may come across due to regional differences and seasonal differences upon the fuel amount reduction driving, based on an engine RPM, an engine state, an elapsed starting time, and an engine coolant temperature, drivability robustness is maintained.

For example, the low temperature/low volatile fuel condition control mode is a mode that detects an excessive RPM drop phenomenon of an actual RPM relative to a targeted RPM under the low volatile fuel conditions determined upon the fuel reduction driving, performs switching to a rich lambda control to increase a fuel amount to thereby prevent the adverse effect on the drivability, on the basis of a followability evaluation result of the actual RPM relative to the targeted RPM, performs combustion mode switching from a suction single injection to a suction compression split injection, or simultaneously performs the combustion mode switching and the increase in the fuel amount.

Therefore, the low temperature/low volatile fuel condition control mode greatly contributes to the drivability robustness of a gasoline vehicle, in particular, a gasoline vehicle using a gasoline direct injection (GDI) engine, under the low temperature/low volatile fuel conditions.

SUMMARY

However, the low temperature/low volatile fuel condition control mode cannot but have the following limitations.

For example, the increasing amount of fuel is focused on a revolution per minute (RPM) drop, and thus emission (EM) may be increased with the increase in the fuel amount even in the RPM drop due to various causes and driver complaints may be caused due to a countermeasure after the RPM drop.

As another example, the combustion mode switching is limited to the suction compression injection, and thus the problem of the low temperature drivability due to the pre-countermeasure before the RPM drop may be previously prevented. However, the limitation of the combustion mode switching may generate smoke and cause environmental pollution due to the smoke, which may lead to consumer complaints.

An embodiment of the present disclosure is directed to a method for engine drivability robustness by variable indexing capable of reducing emission of HC and smoke using a suction single injection by an injection mode index like a general fuel condition, in particular, ensuring the robust drivability of the engine without entering an unnecessary low volatile function in a vulnerable section of the GDI low volatile fuel condition & drivability, by calculating an injection mode index for three kinds of suction injections based on an engine state of starting, stop, and deceleration under low volatile fuel conditions of fuel supplied to the engine and determining a rich lambda control based on a lambda control factor increasing a fuel amount of a lambda injection, and vehicle thereof.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method for engine drivability robustness includes: detecting, by an engine controller, an engine state, an elapsed starting time, an engine coolant temperature, and an engine torque as basic variables and an oxygen sensor detection value, an open value of a throttle valve, and a vehicle speed as index variables, as variables of a low volatile fuel condition of fuel supplied to an engine; determining the low volatile fuel condition based on the basic variables and the index variables; performing an index classification mode that calculates an injection mode index for the injection mode index and determines a lambda control factor when the low volatile fuel condition is satisfied; and performing an injection control mode step that performs switching to a rich lambda control by the lambda control factor upon an engine RPM drop during performance of a fuel injection by the calculated injection mode index.

The basic variables determining the low volatile fuel condition may be the engine coolant temperature and the elapsed starting time, and the engine coolant temperature may be defined as a starting water temperature so that the starting water temperature is present between a lower bound of the starting water temperature and an upper bound of the starting water temperature, and the elapsed starting time may be defined as run time to be determined as the low volatile fuel condition when the run time is present between a lower bound of the run time and an upper bound of the run time.

The performing of the index classification mode may include: determining the starting condition, the stop condition, and the deceleration condition, respectively; in the case of the starting condition, calculating the injection mode index as 1 by an engine RPM increasing slope and a throttle valve increasing slope; calculating the injection mode index as 2 on whether conditions of the engine RPM increasing slope and the throttle valve increasing slope are satisfied or calculating the lambda injection mode in which the lambda control factor is set together with the injection mode index calculated as 2, if a vehicle speed and combustion stability are satisfied upon an engine idle other than the starting condition.

The starting condition may be determined as an engine load, the calculation condition of the injection mode index 1 may correspond to a case in which the throttle valve increasing slope is greater than a threshold value while the engine RPM increasing slope is smaller than the threshold value, and the injection mode index may be calculated as 0 when the throttle valve increasing slope is smaller than the threshold value while the engine RPM increasing slope is greater than the threshold value.

The engine idle may be determined as an idle revolution per minute (RPM) to be applied to the stop condition and the deceleration condition, the calculation condition of the injection mode index 2 may correspond to a case in which the throttle valve increasing slope is smaller than the threshold value while the engine RPM increasing slope is greater than the threshold value in a state in which the combustion stability is greater than the threshold value while the vehicle speed is smaller than the threshold value, and the injection mode index may be calculated as 0 when the combustion stability is smaller than the threshold value while the vehicle speed is greater than the threshold value.

The calculation of the lambda injection mode may correspond to a case in which the throttle valve increasing slope is larger than the threshold value while the engine RPM increasing slope is smaller than the threshold value in a state in which the combustion stability is greater than the threshold value while the vehicle speed is smaller than the threshold value. The lambda control factor may be set to be greater than 0.

The performing of the injection control mode may include: matching a suction compression injection with injection mode index 0, a suction split injection with injection mode index 1, and a suction compression split injection with injection mode index 2; performing the suction compression injection when the injection mode index is 0, performing the suction split injection when the injection mode index is 1, performing the suction compression split injection when the injection mode index is 2; checking the engine RPM drop; and performing the rich lambda control upon the RPM drop.

The engine RPM drop may be determined as a case in which a deviation between a targeted engine RPM and an actual engine RPM is smaller than a threshold value. The rich lambda control may be matched with the injection mode index 2.

In accordance with another embodiment of the present disclosure, a vehicle includes: an engine controller configured to calculate injection mode indexes 0, 1, and 2 dividing a fuel injection into a suction compression injection, a suction split injection, and a suction compression split injection under the starting, stop, and deceleration conditions when a low volatile fuel condition of fuel supplied to an engine is formed and determine to be an engine RPM drop when a deviation between a targeted engine RPM and an actual engine RPM is smaller than a threshold value to perform a rich lambda control by a lambda control factor greater than 0 together with injection mode index 2; and an engine system configured to include the engine controlled by the engine controller.

The engine controller may consist of an engine ECU, together with a variable index map handling an engine RPM, an engine state, an elapsed starting time, an engine coolant temperature, an engine torque, an oxygen sensor detection value, an open value of a throttle valve, and a vehicle speed as input data and a control signal output outputting a signal of the engine controller to the engine.

The engine may be a gasoline direct injection (GDI) engine and gasoline may be supplied to the GDI engine as fuel by the engine system.

DETAILED DESCRIPTION OF SPECIFIC EMBODIMENTS

Figure 1:
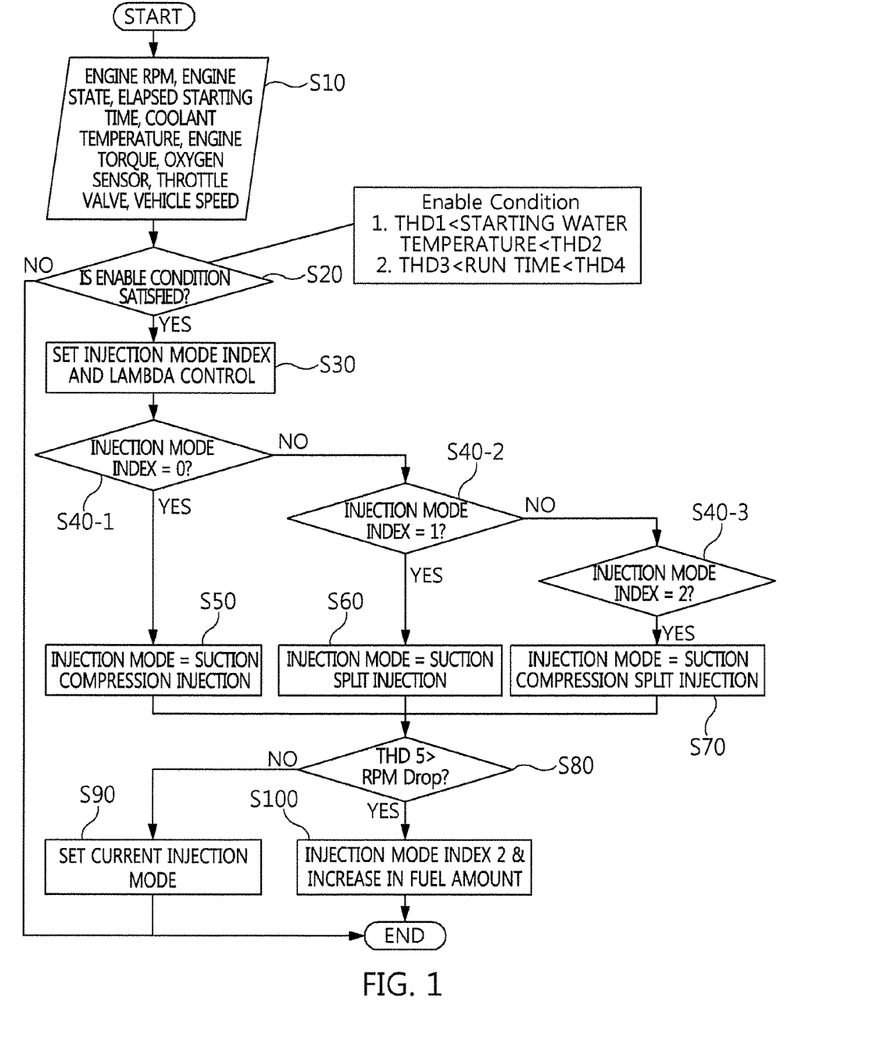
FIG. 1 is a flow chart of a method for engine drivability robustness by variable indexing according to an exemplary embodiment of the present disclosure.

Referring to FIG. 1, a method for engine drivability robustness includes detecting a low volatile ignition fuel condition by including an oxygen sensor detection value, an open value of a throttle valve, and a vehicle speed in existing variables (S10), generates an injection mode index in consideration of an engine state (e.g., starting, stop, and deceleration due to an engine load) (S30) if the low volatile fuel condition is satisfied (S20), and performs the low volatile fuel condition control in a single and variable injection mode divided by injection mode indexes 0, 1, and 2 and a lambda injection mode to which a lambda control factor greater than 0 are assigned (S40-1 to S100-2).

As a result, the method for engine drivability robustness is divided into the single injection mode and the variable injection mode, reduces an emission of HC and smoke under normal fuel conditions since the single injection mode is a suction single injection, and ensures robust drivability of an engine in a vulnerable section of gasoline direct injection (GDI) low volatile fuel condition & drivability since the variable injection mode is a suction split injection, a suction compression split injection, and an increase in fuel amount (i.e., lambda injection mode in which a rich lambda control is performed under a condition of lambda control factor>0).

Figure 2:
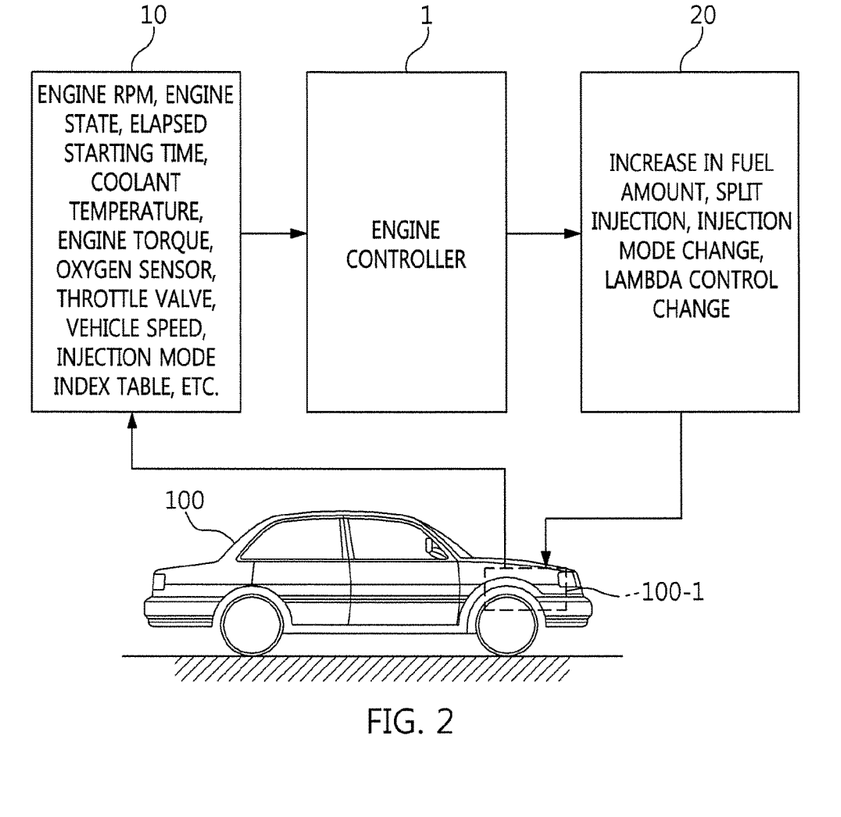
FIG. 2 is an example of a vehicle of engine drivability robustness by variable indexing according to an exemplary embodiment of the present disclosure.

Referring to FIG. 2, the vehicle 100 includes an engine system 100-1 having an engine and an engine controller 1 for controlling the drivability robustness of the engine by variable indexing while controlling the engine system 100-1.

Specifically, the engine is a GDI engine that uses gasoline as a fuel. Therefore, the engine system 100-1 is the same as a GDI engine system configured to be suited for a GDI engine.

Specifically, the engine controller 1 includes a variable index map 10 and a control signal output unit 20, and controls the engine in the single injection mode, the variable injection mode, and the lambda injection mode. For example, the variable index map 10 may handle an engine revolution per minute (RPM), an engine state (e.g., starting, stop, and deceleration of a vehicle), an elapsed starting time, an engine coolant temperature, an engine torque, an oxygen sensor detection value for exhaust gas, an open value of a throttle valve, a vehicle speed, and the like as input data, has an injection mode index table, and provides the injection mode index to an engine controller 1 together with the input data. The control signal output unit 20 outputs the increase in fuel amount and an on/off signal as the split injection control signal output from the engine controller 1 or pulse-width modulation (PWM) duty to the engine system 100-1, thereby changing the injection mode and the lambda control of the engine.

Therefore, the engine controller 1 performs a procedure for engine drivability robustness by variable indexing using information on the variable index map 10, and outputs a control signal using the control signal output unit 20, thereby ensuring the robust drivability in the vulnerable section of the general fuel conditions, the GDI low volatile fuel condition, and the drivability. Particularly, the engine controller 1 may be a dedicated controller but consists of an engine electronic control unit (engine ECU) together with the variable index map 10 and the control signal output unit 20.

Hereinafter, the method for engine drivability robustness by variable indexing of FIG. 1 will be described in detail with reference to FIGS. 2 to 4. The control subject is the engine controller 1 including the variable index map 10 and the control signal output unit 20 and the control target is the engine of the engine system 100-1. In particular, each of THD 1, THD 2, THD 3, THD 4, THD 5, THD 6, THD 7, THD 8, THD 9, THD 10 and THD 11 is a threshold value and is defined as follows.

THD1: Lowest temperature condition of coolant (−10° C.)
THD2: Highest temperature condition of coolant (40° C.)
THD3: Minimum time of engine runtime (operating time) (2 seconds)
THD4: Maximum time of engine runtime (operating time) (100 seconds)
THD5: Deviations of actual engine RPM relative to targeted engine RPM

| | Target RPM | | | | |
|---|---|---|---|---|---|
| | 600 | 800 | 1200 | 1500 | 2000 |
| Deviation | 150 | 150 | 150 | 200 | 200 |

THD6: rpm increasing slope for entry into injection mode index No. 1 (10 rpm/s)
THD7: TPS increasing slope for entry into injection mode index No. 1 (0.5 degree/s)
THD8: Maximum vehicle speed condition for entry into injection mode index No. 2 (10 kph)
THD9: Reference of rate of change in rpm angular velocity for determining combustion stability of engine (1000)—dimensionless number and reduction in combustion stability if the value is large

| Load (%) | 600 | 800 | 1000 | 1200 | 1400 |
|---|---|---|---|---|---|
| 10% | 1000 | 1000 | 1000 | 1000 | 1000 |
| 20% | 1200 | 1200 | 1200 | 1200 | 1200 |
| 40% | 1300 | 1300 | 1300 | 1300 | 1300 |
| 60% | 1500 | 1500 | 1500 | 1500 | 1500 |
| 80% | 1600 | 1600 | 1600 | 1600 | 1600 |
| 100% | 2000 | 2000 | 2000 | 2000 | 2000 |

THD10: rpm increasing slope for entry into injection mode index No. 1 (5 rpm/s)
THD11: TPS increasing slope for entry into injection mode index No. 2 (1 degree/s)

The step S10 is a step in which the low volatile fuel condition is detected by the engine controller 1. Referring to FIG. 2, the variable index map 10 receives the engine RPM, the engine state, the elapsed starting time, the engine coolant temperature, the engine torque, the oxygen sensor detection value, the open value of the throttle valve, and the vehicle speed that are detected by the engine system 100-1 of the vehicle 100 and the variable index map 10 is provided to the engine controller 1 by communication and thus is detected as the low volatile fuel condition variables in the engine controller 1. In this case, the engine RPM, the engine state, the elapsed starting time, the engine coolant temperature, and the engine torque are basic parameters of the low volatile fuel condition, while the oxygen sensor detection value, the open value of the throttle valve, and the vehicle speed are divided by the low volatile fuel condition index variables for performing the engine drivability robustness.

The S20 is a step of determining whether to enter the low volatile fuel conditions by the engine controller 1. An enable condition is applied to meet the low volatile fuel condition, and the enable condition applies the following relational formula to a starting water temperature that is the engine coolant temperature at the starting and the run time that is an engine operating time.

Enable Condition #1: THD 1<starting water temperature<THD 2
Enable Condition #2: THD 3<RUN TIME<THD 4

In the above formula, "<" is an inequality sign indicating the size relationship between two values of A and B and "A<B" indicates that B is greater than A. The "starting water temperature" is the detection starting water temperature that is applied at the current determination time and the "run time" is the detection run time that is applied at the current determination time.

As a result, the state of the engine system 100-1 do not require the entry into the low volatile fuel conditions when the Enable Condition #1 and the Enable Condition #2 are not satisfied, and therefore is initialized after the engine drivability robustness logic by the variable indexing of the engine controller 1 ends. Here, the initialization means that the injection mode index is set to be 0 (see S39 in FIG. 3). This means that the detection of the low volatile fuel condition of the step S10 and the determination on whether to enter the low volatile fuel condition of the step S20 are continued during the operation of the engine system 100-1. Particularly, injection mode index 0 means that the fuel injection is composed of the suction single injection. On the other hand, when the Enable Condition #1 and the Enable Condition #2 are satisfied, the state of the engine system 100-1 requires the entry into the low volatile fuel condition, so the engine controller 1 enters S50.

The step S30 is a step of calculating, by the engine controller 1, the injection mode index for dividing the fuel injection into the suction single injection, the suction split injection, and the suction compression split injection and determining the lambda control factor for dividing the lambda injection by the rich lambda control [i.e., setting the lambda control factor to be greater than 0 (lambda control>0)] of the increase in fuel amount, which is defined as an index classification mode. Referring to FIG. 2, the engine controller 1 matches an injection mode index table of the variable index map 10 to determine the lambda control mode matched with the injection mode and the injection mode index divided by the injection mode indexes 0, 1, and 2. For example, the injection mode is divided into the suction single injection having the injection mode index of 0, the suction split injection having the injection mode index of 1, and the suction compression split injection having the injection mode index of 2 and the lambda control mode increases the increase in fuel amount by matching the increase in fuel amount with any one of the injection mode indexes 0, 1, and 2. As a result, the low volatile fuel condition control is performed by being divided into the single injection mode, the variable injection mode, and the lambda control mode (S40-1 to S100-2).

Figure 3:
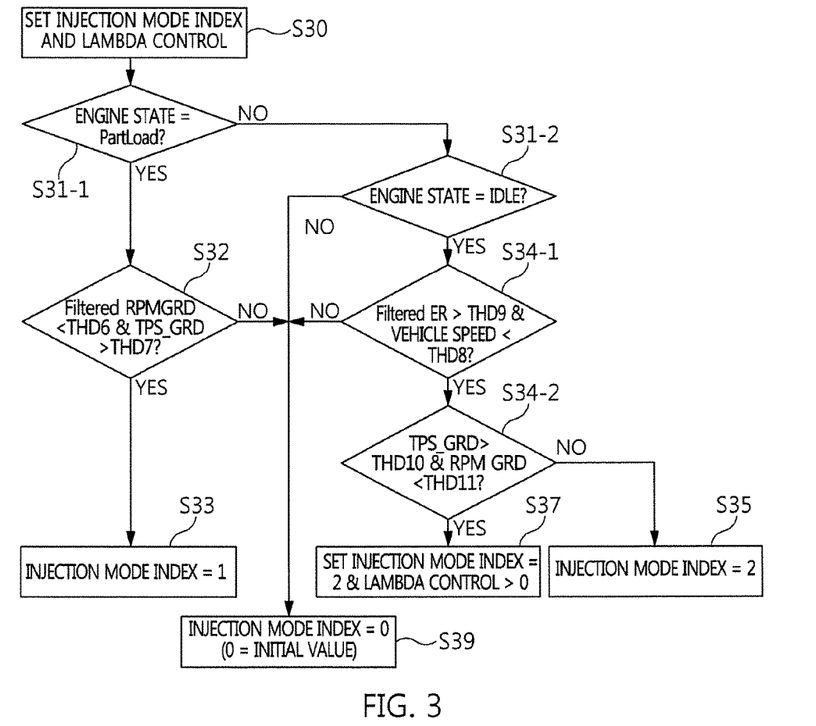
FIG. 3 is a flowchart of a method for setting an injection mode index according to an exemplary embodiment of the present disclosure.
Figure 4A:
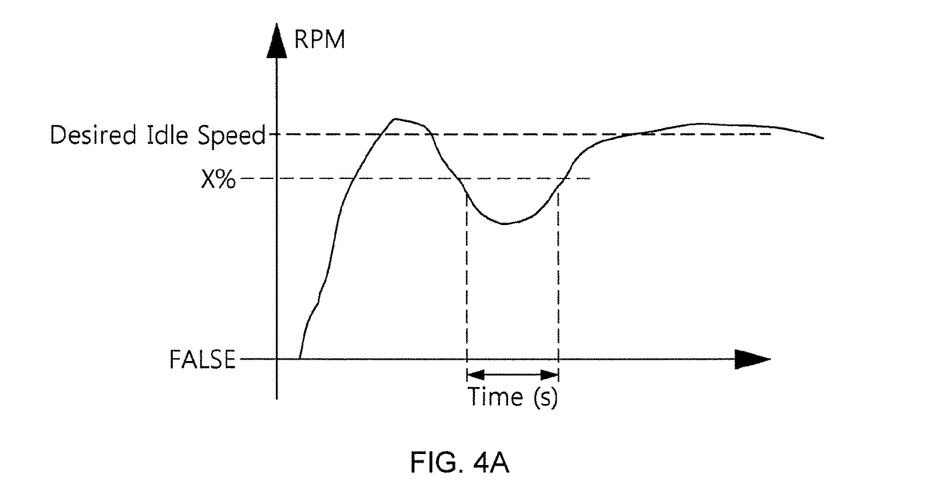
FIGS. 4A and 4B are examples of an engine revolution per minute (RPM) drop condition in which the engine drivability robustness is performed by changing the lambda control according to an exemplary embodiment of the present disclosure.
Figure 4B:
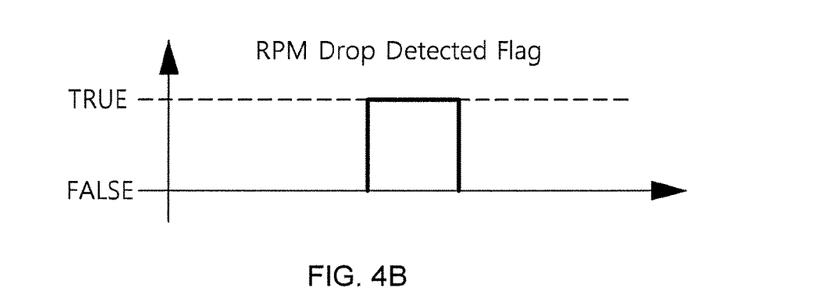

FIG. 3 illustrates a method for the index classification mode for calculating the injection mode index for dividing the fuel injection into the suction single injection, the suction split injection, and the suction compression split injection and determining the lambda control factor for dividing the lambda injection by the rich lambda control of the increase in fuel amount. By doing so, results of the index classification mode build the injection mode index table of the variable index map 10.

The index classification mode of the step S30 reflects the control of the engine system 100-1 according to the following conditions of the vehicle 100:

1) Starting condition: The starting condition applies the injection mode index 1. For example, in the starting condition, the suction-suction injection mode (i.e., single injection mode) is applied when the increasing slope of the throttle valve at the beginning of the starting exceeds a reference value and the RPM increasing amount is equal to or less than the reference value.

2) Stop condition: The stop condition applies to the injection mode index 2. For example, in the step condition like an engine idle, the suction-compression split injection mode (i.e., variable injection mode) is applied in the suction-suction injection mode (i.e., single injection mode) when steady condition engine roughness exceeds the specified reference value. This is due to the fact that the suction-compression injection mode relative to the single injection mode is robust to fuel natures.

3) Deceleration condition: The deceleration condition applies the injection mode index 2 and the increase in fuel amount (lambda control>0). For example, in the deceleration condition in which the engine off is most vulnerable, when the vehicle speed and the RPM decreasing slope exceed the reference value and the vehicle enters the idle condition and then the engine roughness exceeds the reference value and the increasing slope of the throttle valve exceeds the reference value, the suction-suction injection mode (that is, single injection mode) is applied. In particular, in the condition in which the vehicle speed and the RPM decreasing slope satisfy the reference value, when the lambda control value is in a negative direction and the lambda control factor is reset to be 0 when the vehicle enters the idle condition. This is due to the vulnerability to the engine off when the idle condition lambda control tendency is different in the deceleration condition.

The step S31-1 is a step of determining the engine load by the engine controller 1, which corresponds to the starting condition. Referring to FIG. 2, the engine controller 1 checks the starting state from the engine state provided from the variable index map 10 by applying the following relational formula.

Engine STATE=PartLoad

In the above formula, "=" is an inequality sign indicating the size relationship between the two values of A and B and "A=B" indicates that A and B have the same value. "PartLoad" is the engine load indicating the starting of the vehicle.

As a result, if the "PartLoad" indicating the engine state matches the starting condition, the engine controller 1 enters the step S32 to calculate the injection mode index depending on the starting condition.

The step S32 is a step of calculating, by the engine controller 1, the injection mode indexes of 0 and 1. Referring to FIG. 2, the engine controller 1 applies the following relational formula of the engine RPM increasing slope depending on the engine RPM provided from the variable index map 10 and the throttle valve increasing slope depending on the open value (%) of the throttle valve.

Condition of determining engine RPM increasing slope: Filtered RPM GRD<THD 6

Condition of determining throttle valve increasing slope: TPS_GRD>THD 7

Here, "<" and ">" each are inequality signs indicating the size relationship between two values of A and B and "A<B" indicates that B has a value greater than A and "A>B" indicates that A is a value greater than B. The "Filtered RPM GRD" is the engine RPM increasing slope detected at the current determination time (i.e, state in which the starting condition is satisfied) and the "TPS_GRD" is the throttle valve increasing slope detected at the current determination time.

As a result, the engine controller 1 sets the injection mode index to be "0" like the step S39 when the conditions of the "Filtered RPM GRD" and the "TPS_GRD" are not satisfied (that is, state in which the Filtered RPM GRD is smaller than THD 6 and at the same time the TPS_GRD does not satisfy the condition greater than THD 7), but classifies the injection mode index into "1" like the step S33 when the conditions of the "Filtered RPM GRD" and the "TPS_GRD" are satisfied (that is, state in which the Filtered RPM GRD is smaller than THD 6 and at the same time the TPS_GRD satisfies the condition greater than THD 7. Here, the injection mode index 0 is the suction single injection and the injection mode index 1 is the suction split injection.

Meanwhile, the engine controller 1 determines that the current vehicle state deviates from the starting condition when the "PartLoad" indicating the engine state does not match the starting condition to be switched to the determination step of the stop condition and the deceleration condition, which is implemented by the steps S34-1, S34-2, S35, and S37.

In the steps S31-2, S34-1, S34-2, S35 and S37, the steps S31-2 and S34-1 correspond to the stop conditions and the steps S31-2, S34-1 and S34-2 correspond to the deceleration conditions.

The step S31-2 is the step of determining the engine idle by the engine controller 1, which means a satisfaction condition for determining the stop condition and the deceleration condition. Referring to FIG. 2, the engine controller 1 applies the following relational formula of the idle RPM relative to the engine speed provided from the variable index map 10.

Engine STATE=IDLE

Here, "=" is an inequality sign indicating the size relationship between the values of A and B, and "A=B" indicates that A and B have the same value, and "IDLE" is engine idling and may be defined to be 500 RPM or less.

As a result, if the engine controller 1 does not confirm "IDLE" indicating the engine state, the injection mode index is set to be "0" like the step S39, whereas if the "IDLE" indicating the engine state is confirmed, the engine controller 1 enters the step S34-1. Here, the injection mode index 0 is the suction single injection.

The step S34-1 is a step of determining, by the engine controller 1, the vehicle speed condition of the vehicle and the combustion stability of the engine. Referring to FIG. 2, the engine controller 1 applies the following relational formula to the maximum vehicle speed condition for the vehicle speed kph provided from the variable index map 10, the engine load (%) matched to the dimensionless number and the combustion stability according to the engine RPM.

Condition of determining maximum vehicle speed: Vehicle speed<THD 8

Condition of determining combustion stability: Filtered ER>THD 9

Here, "<" and ">" each are inequality signs indicating the size relationship between two values of A and B and "A<B" indicates that B has a value greater than A and "A>B" indicates that A is a value greater than B. The "Filtered ER" is the matched value of the engine load (%) detected in the current determination time (that is, the state where the stop condition is satisfied) and the engine RPM, and the "vehicle speed" is the vehicle speed detected at the current determination time.

As a result, the engine controller 1 sets the injection mode index to be "0" like the step S39 when the conditions of the "vehicle speed" and the "Filtered ER" are not satisfied (i.e., the state in which the condition in which the Filtered ER is greater than THD 9 is not satisfied while the vehicle speed is smaller than THD 8), whereas the engine controller 1 enters the step S34-2 when the conditions of the "vehicle speed" and the "filtered ER" are satisfied (i.e., the state in which the condition in which the Filtered ER is greater than THD 9 while the vehicle speed is smaller than THD 8 is satisfied). Here, the injection mode index 0 is the suction single injection.

The step S34-2 is a step of differentiating, by the engine controller 1, between the stop condition and the deceleration condition. Referring to FIG. 2, the engine controller 1 applies the following relational formula of the engine RPM increasing slope depending on the engine RPM provided from the variable index map 10 and the throttle valve increasing slope depending on the open value (%) of the throttle valve.

Condition of determining throttle valve increasing slope: TPS_GRD>THD 10

Condition of determining engine RPM increasing slope: RPM_GRD<THD 11

Here, "<" and ">" each are inequality signs indicating the size relationship between two values of A and B and "A<B" indicates that B has a value greater than A and "A>B" indicates that A is a value greater than B. The "TPS_GRD" is the throttle valve increasing slope detected at the current determination time (that is, the state where the stop condition is satisfied), and the "RPM_GRD" is the engine RPM increasing slope detected at the current determination time (that is, the state in which the stop condition is satisfied).

As a result, the engine controller 1 determines the stop condition to set the injection mode index to be "2" like the step S35 when the conditions of the "TPS_GRD" and the "RPM_GRD" are not satisfied (i.e., the state in which the RPM_GRD is smaller than THD 11 while the TPS_GRD is greater than THD 10 and), whereas the engine controller 1 determines the deceleration condition when the conditions of the "TPS_GRD" and the "RPM_GRD" are satisfied (i.e., the state in which the RPM_GRD is smaller than THD 11 while the TPS_GRD is greater than THD 10) to set the injection mode index to be "2" in which the fuel amount is increased like the step S37. Here, the injection mode index 2 is the suction compression split injection, and the injection mode index "2" in which the fuel amount is increased is the lambda injection mode in which the rich lambda control in which the lambda control factor is set to be a value greater than 0 is performed.

Referring again to FIG. 1, the engine controller 1 performs the low volatile fuel condition entry control by being divided into the step S50 following the step S40-1, step S60 following the step S40-2, step S70 following the step S40-3, and steps S90 and S100 following step S80.

The single injection mode of S50 is the suction single injection, which is performed when the injection mode index is 0 like S40-1. In this case, the suction single injection reduces the emission of the HC and the smoke generated from the engine system 100-1 under the general fuel conditions.

The variable injection mode of S60 is the suction split injection, which is performed when the injection mode index is not 0 but 1, like S40-2. In this case, the suction split injection ensures the engine drivability robustness without increasing the fuel amount in the vulnerable section of the GDI low volatile fuel condition & drivability.

The variable injection mode of the step S70 is the suction compression split injection, which is performed when the injection mode index is not 0 and 1 but 2, like S40-3. In this case, the suction compression injection ensures the engine drivability robustness without increasing the fuel amount in the vulnerable section of the GDI low volatile fuel condition & drivability.

The step S80 is a step in which it is determined, by the engine controller 1, whether or not the lambda control in which the fuel amount is increased is performed. Referring to FIG. 2, the engine controller 1 applies the following relational formula in which the engine RPM drop is determined by the deviation between the targeted engine RPM provided from the variable index map 10 and the actual engine RPM.

Condition of determining engine RPM drop: THD 5>Engine RPM drop

In the above formula, ">" is an inequality sign indicating the size relationship between two values of A and B and "A>B" indicates that A is greater than B. The "engine RPM drop" is an engine RPM drop value calculated by the deviation between the targeted engine RPM and the actual engine RPM at the current determination time (i.e., variable injection mode control by any one of the injection mode indexes 0, 1, and 2). "THD 5" is a reference engine RPM drop value that needs to switch the variable injection mode to the lambda injection mode.

Referring to the RPM change of the engine speed with the passage of time in FIGS. 4A and 4B, when "X %" is set to be the engine RPM drop reference RPM on the basis of the required idle speed, the engine RPM drop occurs below the "X %" for the time (second) when the detected RPM is held Engine RPM drops below "X %". As a result, an engine RPM drop detected flag is switched from false to true, and a TRUE detected flag means the switching of the lambda injection mode in which the fuel amount is increased.

The step S90 is a step of setting a false flag of the detected flag not to consider the engine RPM drop which is a cause of the engine off to thereby be set as the previous variable injection mode (i.e., the current injection mode at the engine RPM drop determination time). Here, the current injection mode set means that the injection mode index based intake air injection control applied at the RPM drop determination time is maintained as it is, and thus may be any one of the injection mode indexes 0, 1, and 2.

On the other hand, the step S100 is a step of considering the engine RPM drop, which is the cause of the engine off, by the true flag switching of the detected flag to implement the intake injection mode and the lambda injection mode together. Here, the lambda control mode means "lambda control>0" in which the fuel amount is increased, and the "lambda control>0" means that the lambda control factor is set to be larger than 0. As a result, the rich lambda control by the increase in fuel amount ensures the engine drivability robustness even in the vulnerable section of the drivability of the deceleration condition in which the engine off most frequently occurs together with the GDI low volatile fuel condition.

As described above, the method for engine drivability robustness of a vehicle according to the present embodiment includes dividing, by the engine controller, the engine state into the starting condition, the stop condition, and the deceleration condition, dividing a fuel injection into the injection mode index matched with the suction compression injection of the starting condition, the suction split injection of the stop condition, and the suction compression split injection of the deceleration condition, respectively, and performing the switching to the lambda injection mode in which the fuel amount is increased to prevent the engine off due to the low volatile fuel upon the engine RPM drop calculated by the deviations between the targeted engine RPM and the actual engine RPM under the deceleration condition. As a result, it is possible to increase the application rate of the suction single injection that reduces the emission of the HC and the smoke like the general fuel condition in the engine state divided into the starting, the stop, and the deceleration, in particular, ensure the engine drivability robustness in the vulnerable section of the GDI low volatile fuel condition & drivability by the rich lambda control of the deceleration condition in which the engine off most frequently occurs.

According to the exemplary embodiments of the present disclosure, the vehicle may implement the following advantages and effects by achieving the drivability robustness of the engine by the variable indexing under the low temperature and low volatile fuel conditions.

First, it is possible to prevent the unnecessary entry into the low volatile function and ensure the robust drivability by taking the countermeasure by making the determinations different by the vehicle driving conditions under the starting condition/stop condition/deceleration condition of the vehicle. Second, the driver complaints caused by the low temperature/low volatile fuel condition control mode for the drivability robustness may be solved by the pre-countermeasure using the combustion mode switching deviating from the post-countermeasure depending on the sudden RPM drop of the engine. Third, the robust drivability of the vehicle may be ensured by the suction-compression injection and the rich lambda control. Fourth, the HC and smoke emission are reduced in the suction single injection mode. Fifth, it is possible to reduce the cost of the exhaust gas reduction device and improve the commerciality of the vehicle by improving the reduction in the emission gas and ensuring the robust drivability. Sixth, in particular, it is possible to ensure the robust drivability by applying the suction-compression injection and the rich lambda control only in the vulnerable section of the low volatile fuel conditions & drivability in the gasoline vehicle using the GDI engine and reduce the HC and smoke emission using the suction single injection mode under the general fuel conditions.

What is claimed is:

1. A method for engine drivability robustness, the method comprising:
    dividing, by an engine controller, an engine state into a starting condition, a stop condition, and a deceleration condition;
    dividing an injection mode index of a fuel injection into a suction compression injection of the starting condition, a suction split injection of the stop condition, and a suction compression split injection of the deceleration condition, respectively, depending on a low volatile fuel condition; and
    performing a variable indexing mode to prevent an engine off by applying a lambda control factor for a rich lambda control by an increase in fuel amount to the deceleration condition.

2. The method of claim 1, wherein the variable indexing mode uses an oxygen sensor detection value, an open value of a throttle valve, and a vehicle speed as index variables while using an elapsed starting time, an engine coolant temperature, and an engine torque as basic variables together with the engine state to detect determination variables of the low volatile fuel condition, determines the low volatile fuel condition by the basic variables and the index variables, performs an index classification mode in which the injection mode index is calculated and the lambda control factor is determined when the low volatile fuel condition is satisfied, and performs an injection control mode switched to the rich lambda control by the lambda control factor upon an engine revolutions per minute (RPM) drop while the fuel injection is performed by the calculated injection mode index.

3. The method of claim 2, wherein the basic variables for determining the low volatile fuel condition are the engine coolant temperature and the elapsed starting time.

4. The method of claim 3, wherein the engine coolant temperature is defined as a starting water temperature so that the starting water temperature is present between a lower bound of the starting water temperature and an upper bound of the starting water temperature, and the elapsed starting time is defined as a run time to be determined as the low volatile fuel condition when the run time is present between a lower bound of the run time and an upper bound of the run time.

5. The method of claim 2, wherein the calculation of the injection mode index sets the suction compression injection to be injection mode index 0, the suction split injection to be injection mode index 1, and the suction compression split injection to be injection mode index 2 and the lambda control factor is set to increase a fuel amount.

6. The method of claim 2, wherein the lambda control factor is greater than 0 upon the rich lambda control to increase a fuel amount.

7. The method of claim 2, wherein the performing of the index classification mode includes:
    determining the starting condition, the stop condition, and the deceleration condition, respectively;
    calculating the injection mode index as 1 by an engine RPM increasing slope and a throttle valve increasing slope, in the case of the starting condition; and
    calculating the injection mode index as 2 on whether conditions of the engine RPM increasing slope and the throttle valve increasing slope are satisfied or calculating the lambda injection mode in which the lambda control factor is set together with the injection mode index calculated as 2, if a vehicle speed and combustion stability are satisfied upon an engine idle other than the starting condition.

8. The method of claim 7, wherein the starting condition is determined as an engine load, the calculation condition of the injection mode index 1 corresponds to a case in which the throttle valve increasing slope is greater than a threshold value while the engine RPM increasing slope is smaller than the threshold value, and the injection mode index is calculated as 0 when the throttle valve increasing slope is smaller than the threshold value while the engine RPM increasing slope is greater than the threshold value.

9. The method of claim 7, wherein the engine idle is determined as an idle revolution per minute (RPM) to be applied to the stop condition and the deceleration condition, the calculation condition of the injection mode index 2 corresponds to a case in which the throttle valve increasing slope is smaller than the threshold value while the engine RPM increasing slope is greater than the threshold value in a state in which the combustion stability is greater than the threshold value while the vehicle speed is smaller than the threshold value, and the injection mode index is calculated as 0 when the combustion stability is smaller than the threshold value while the vehicle speed is greater than the threshold value.

10. The method of claim 7, wherein the calculation of the lambda injection mode corresponds to a case in which the throttle valve increasing slope is larger than the threshold value while the engine RPM increasing slope is smaller than the threshold value in a state in which the combustion stability is greater than the threshold value while the vehicle speed is smaller than the threshold value.

11. The method of claim 7, wherein the lambda control factor is set to be greater than 0.

12. The method of claim 2, wherein the performing of the injection control mode may include matching the suction compression injection with injection mode index 0, the suction split injection with injection mode index 1, and the suction compression injection with injection mode index 2, performing the suction compression injection when the injection mode index is 0, performing the suction split injection when the injection mode index is 1, performing the suction compression split injection when the injection mode index is 2, checking the engine RPM drop, and performing the rich lambda control upon the RPM drop.

13. The method of claim 12, wherein the engine RPM drop is determined as a case in which a deviation between a targeted engine RPM and an actual engine RPM is smaller than a threshold value.

14. The method of claim 12, wherein the rich lambda control is matched with the injection mode index 2.

15. A vehicle, comprising:
an engine controller configured to calculate injection mode indexes 0, 1, and 2 dividing a fuel injection into a suction compression injection, a suction split injection, and a suction compression split injection under the starting, stop, and deceleration conditions when a low volatile fuel condition of fuel supplied to an engine is determine to be an engine RPM drop when a deviation between a targeted engine RPM and an actual engine RPM is smaller than a threshold value to perform a rich lambda control by a lambda control factor greater than 0 together with injection mode index 2; and
an engine system configured to include the engine controlled by the engine controller.

16. The vehicle of claim 15, wherein the engine controller includes a variable index map handling an engine RPM, an engine state, an elapsed starting time, an engine coolant temperature, an engine torque, an oxygen sensor detection value, an open value of a throttle valve, and a vehicle speed as input data and a control signal output unit outputting a signal of the engine controller to the engine.

17. The vehicle of claim 16, wherein the engine controller consists of an engine electronic control unit (ECU), together with the variable index map and the control signal output unit.

18. The vehicle of claim 15, wherein the engine is a gasoline direct injection (GDI) engine using gasoline as fuel.

* * * * *